US012719550B2

(12) United States Patent
Nilsson et al.

(10) Patent No.: US 12,719,550 B2
(45) **Date of Patent: *Aug. 25, 2026**

(54) BEAM SELECTION FOR A RADIO TRANSCEIVER DEVICE

(71) Applicant: Telefonaktiebolaget LM Ericsson (publ), Stockholm (SE)

(72) Inventors: Andreas Nilsson, Gothenburg (SE); Andres Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 35 days.

This patent is subject to a terminal disclaimer.

(21) Appl. No.: 18/621,721

(22) Filed: Mar. 29, 2024

(65) Prior Publication Data

US 2024/0405835 A1 Dec. 5, 2024

Related U.S. Application Data

(63) Continuation of application No. 17/157,353, filed on Jan. 25, 2021, now Pat. No. 11,949,486, which is a (Continued)

(51) Int. Cl.
*H04B 17/336* (2015.01)
*H04B 7/0408* (2017.01)

(Continued)

(52) U.S. Cl.
CPC ....... *H04B 7/06952* (2023.05); *H04B 7/0408* (2013.01); *H04B 7/088* (2013.01);

(Continued)

(58) Field of Classification Search
CPC .. H04B 7/06952; H04B 17/336; H04B 7/088; H04L 5/0051; H04L 25/0204; H04W 24/10

See application file for complete search history.

(56) References Cited

U.S. PATENT DOCUMENTS 7,072,692 B1 7/2006 Katz et al.
8,897,254 B2 11/2014 Koivisto et al.

(Continued)

FOREIGN PATENT DOCUMENTS

CN 101401468 A 4/2009
JP 2014-64294 A 4/2014

(Continued)

OTHER PUBLICATIONS

International Search Report and the Written Opinion of the International Searching Authority, issued in corresponding International Application No. PCT/EP2017/063043, dated Feb. 16, 2018, 18 pages.

(Continued)

*Primary Examiner* — Syed Haider
(74) *Attorney, Agent, or Firm* — Rothwell, Figg, Ernst & Manbeck, P.C.

(57) ABSTRACT

There are provided mechanisms for beam selection. A method is performed by a first radio transceiver device. The method comprises obtaining link quality estimates of a radio signal conveyed to the first radio transceiver device from a second radio transceiver device by means of at least a first beam taken from a first beam set and a second beam. The second beam is wider than the first beam. The method comprises selecting which one of the first beam and the second beam to use for continued communications of radio signals with the second radio transceiver device in accordance with a comparison between the link quality estimates of the first beam and compensated link quality estimates of the second beam.

18 Claims, 4 Drawing Sheets

Related U.S. Application Data continuation of application No. 16/570,622, filed on Sep. 13, 2019, now Pat. No. 10,903,889, which is a continuation of application No. 15/540,911, filed as application No. PCT/EP2017/063043 on May 30, 2017, now Pat. No. 10,439,703.

(51) Int. Cl.

| | |
|---|---|
| ***H04B 7/06*** | (2006.01) |
| ***H04B 7/08*** | (2006.01) |
| ***H04L 5/00*** | (2006.01) |
| ***H04L 25/02*** | (2006.01) |
| *H04W 24/10* | (2009.01) |

(52) U.S. Cl.

CPC ......... *H04B 17/336* (2015.01); *H04L 5/0051* (2013.01); *H04L 25/0204* (2013.01); *H04W 24/10* (2013.01)

(56) References Cited

U.S. PATENT DOCUMENTS

| | | | | |
|---|---|---|---|---|
| 9,407,336 | B2 | 8/2016 | Seol et al. | |
| 9,426,712 | B2 | 8/2016 | Hagerman et al. | |
| 2004/0095907 | A1 | 5/2004 | Agee et al. | |
| 2005/0197149 | A1 | 9/2005 | Iacono et al. | |
| 2005/0221837 | A1 | 10/2005 | Cha et al. | |
| 2006/0286974 | A1* | 12/2006 | Gore | H04B 7/0408 455/422.1 |
| 2008/0132184 | A1 | 6/2008 | Wan et al. | |
| 2009/0098874 | A1 | 4/2009 | Goransson et al. | |
| 2009/0279512 | A1 | 11/2009 | Fujishima et al. | |
| 2009/0323848 | A1 | 12/2009 | Guthy et al. | |
| 2011/0009105 | A1 | 1/2011 | Lee et al. | |
| 2012/0058758 | A1 | 3/2012 | Vaisanen et al. | |
| 2013/0208681 | A1 | 8/2013 | Gore et al. | |
| 2014/0146863 | A1 | 5/2014 | Seol et al. | |
| 2014/0153427 | A1 | 6/2014 | Seo et al. | |
| 2014/0153545 | A1* | 6/2014 | Dimou | H04W 36/302 370/332 |
| 2015/0215077 | A1 | 7/2015 | Ratasuk et al. | |
| 2015/0230263 | A1 | 8/2015 | Roy et al. | |
| 2016/0006122 | A1 | 1/2016 | Seol et al. | |
| 2016/0095102 | A1 | 3/2016 | Yu et al. | |
| 2016/0127919 | A1* | 5/2016 | Hui | H04B 7/0617 342/371 |
| 2016/0315680 | A1 | 10/2016 | Braun et al. | |
| 2016/0353424 | A1 | 12/2016 | Stirling-Gallacher et al. | |
| 2017/0026852 | A1 | 1/2017 | Jaldén et al. | |
| 2017/0104517 | A1* | 4/2017 | Kakishima | H04B 7/0456 |
| 2017/0195938 | A1 | 7/2017 | Gomadam et al. | |
| 2017/0367030 | A1 | 12/2017 | Liu et al. | |
| 2018/0102817 | A1 | 4/2018 | Park et al. | |
| 2018/0279181 | A1 | 9/2018 | Hampel et al. | |

FOREIGN PATENT DOCUMENTS

| | | | |
|---|---|---|---|
| JP | 2016-506112 | A | 2/2016 |
| RU | 2538735 | C2 | 1/2015 |
| WO | 2006138581 | A2 | 12/2006 |
| WO | 2016112962 | A1 | 7/2016 |
| WO | 2016210302 | A1 | 12/2016 |
| WO | 2018029644 | A2 | 2/2018 |
| WO | 2020063126 | A1 | 4/2020 |

OTHER PUBLICATIONS

Office Action dated Feb. 26, 2020, issued in Russian Patent Application No. 2019143099/07(083734), 6 pages.

* cited by examiner

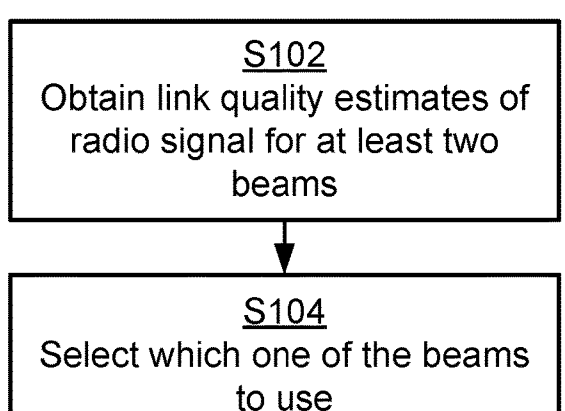
Fig. 2
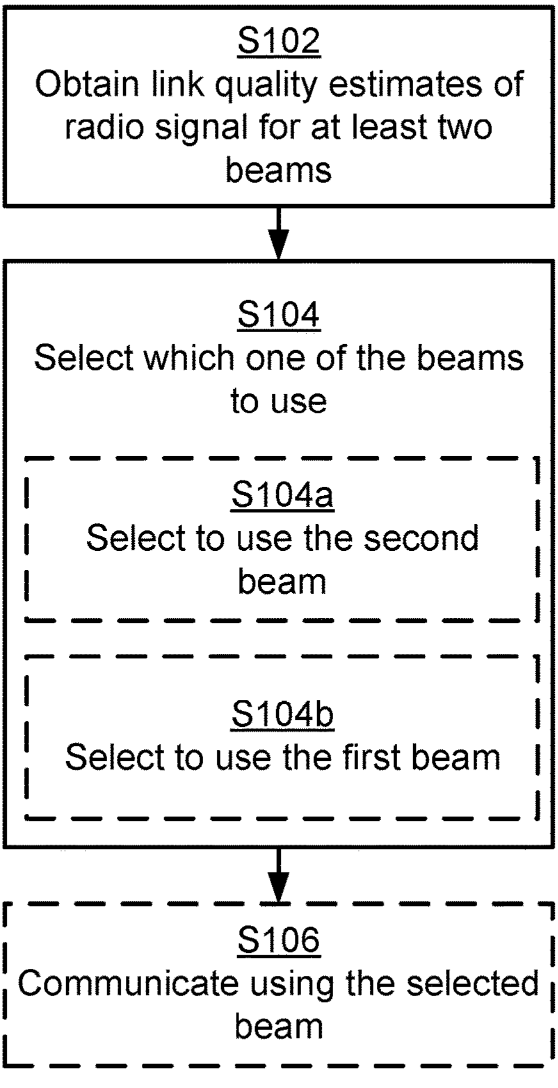
Fig. 3
S202
Configure radio transceiver device how to select which beam to use
Fig. 4

BEAM SELECTION FOR A RADIO TRANSCEIVER DEVICE

CROSS REFERENCE TO RELATED APPLICATIONS

This application is a continuation of and claims priority to U.S. application Ser. No. 17/157,353, filed Jan. 25, 2021, which is a continuation of and claims priority to U.S. application Ser. No. 16/570,622, filed Sep. 13, 2019, now U.S. Pat. No. 10,903,889, which is a continuation of and claims priority to U.S. application Ser. No. 15/540,911, filed Jun. 29, 2017, now U.S. Pat. No. 10,439,703, which is a 35 U.S.C. § 371 National Phase Entry Application from PCT/EP2017/063043, filed May 30, 2017, designating the United States. The disclosures of each of the referenced applications are incorporated herein in their entirety by reference.

TECHNICAL FIELD

Embodiments presented herein relate to a method, a radio transceiver device, a computer program, and a computer program product for beam selection. Embodiments presented herein further relate to a method, a network node, a computer program, and a computer program product for configuring the radio transceiver device for beam selection.

BACKGROUND

In communications networks, there may be a challenge to obtain good performance and capacity for a given communications protocol, its parameters and the physical environment in which the communications network is deployed.

For example, transmission schemes and reception schemes based on the use of narrow beams might be needed at high frequencies to compensate for propagation losses. For a given communication link, a beam can be applied at both the network side (such as at the transmission and reception point (TRP) of a network node) and the user side (such as at terminal devices served by the network node). A beam pair link (BPL) is defined by the beam used by the TRP (denoted TRP beam) for communicating with the terminal device and the beam used by the terminal device (denoted TD beam) for communicating with the TRP. Each of the TRP beam and the TD beam could be used for any of transmission and reception. Likewise, there could be separate BPLs for downlink communications (where the TRP beam is a transmission (TX) beam and where the TD beam is a reception (RX) beam) and uplink communications (where the TRP beam is an RX beam and where the TD beam is a TX beam).

In general terms, a beam management procedure is used to discover and maintain BPLs. A BPL is expected to be discovered and monitored by the network using measurements on downlink reference signals used for beam management, such as channel state information reference signals (CSI-RS).

The CSI-RS for beam management can be transmitted periodically, semi-persistently or aperiodic (such as being event triggered) and they can be either shared between multiple terminal devices or be device-specific.

In order to find a suitable TRP beam the TRP transmits CSI-RS in different TRP TX beams on which the terminal devices performs reference signal received power (RSRP) measurements and reports back the N best TRP TX beams (where the value of N can be configured by the network). Furthermore, the CSI-RS transmission on a given TRP TX beam can be repeated to allow the terminal device to evaluate suitable TD beams, thus enabling so-called TD RX beam training.

The terminal devices and/or the TRP of the network node could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different terminal devices, different implementations will be needed.

During beam pair establishment (e.g. using the example of TD RX beam training for a terminal device with an analog antenna array), it is expected that the terminal device scans through narrow pencil beams pointing in different directions and then selects the TD RX beam that gives the highest measured RSRP. One reason for using narrow beams is that the narrower the beams, the higher the antenna gain. Such narrow high gain beams are especially useful in line of sight channels where the angular spread in the channel seen by the terminal device is rather small. However, there could be situations when it is more beneficial to use a broad beam, and it could hence be difficult for the terminal device to select which beam to use.

Hence, there is still a need for an improved beam selection procedure.

SUMMARY

An object of embodiments herein is to provide an efficient beam selection procedure.

According to a first aspect there is presented a method for beam selection. The method is performed by a first radio transceiver device. The method comprises obtaining link quality estimates of a radio signal conveyed to the first radio transceiver device from a second radio transceiver device by means of at least a first beam taken from a first beam set and a second beam. The second beam is wider than the first beam. The method comprises selecting which one of the first beam and the second beam to use for continued communications of radio signals with the second radio transceiver device in accordance with a comparison between the link quality estimates of the first beam and compensated link quality estimates of the second beam.

According to a second aspect there is presented a radio transceiver device for beam selection. The radio transceiver device comprises processing circuitry. The processing circuitry is configured to cause the radio transceiver device to obtain link quality estimates of a radio signal conveyed to the radio transceiver device from a second radio transceiver device by means of at least a first beam taken from a first beam set and a second beam. The second beam is wider than the first beam. The processing circuitry is configured to cause the radio transceiver device to select which one of the first beam and the second beam to use for continued communications of radio signals with the second radio transceiver device in accordance with a comparison between the link quality estimates of the first beam and compensated link quality estimates of the second beam.

According to a third aspect there is presented a radio transceiver device for beam selection. The radio transceiver device comprises processing circuitry and a storage medium. The storage medium stores instructions that, when executed by the processing circuitry, cause the radio transceiver device to perform operations, or steps. The operations, or steps, cause the radio transceiver device to obtain link quality estimates of a radio signal conveyed to the radio transceiver device from a second radio transceiver device by means of at least a first beam taken from a first beam set and a second beam. The second beam is wider than the first beam. The operations, or steps, cause the radio transceiver device to select which one of the first beam and the second beam to use for continued communications of radio signals with the second radio transceiver device in accordance with a comparison between the link quality estimates of the first beam and compensated link quality estimates of the second beam.

According to a fourth aspect there is presented a radio transceiver device for beam selection. The radio transceiver device comprises an obtain module configured to obtain link quality estimates of a radio signal conveyed to the radio transceiver device from a second radio transceiver device by means of at least a first beam taken from a first beam set and a second beam. The second beam is wider than the first beam. The radio transceiver device comprises a select module configured to select which one of the first beam and the second beam to use for continued communications of radio signals with the second radio transceiver device in accordance with a comparison between the link quality estimates of the first beam and compensated link quality estimates of the second beam.

According to a fifth aspect there is presented a computer program for beam selection. The computer program comprises computer program code which, when run on processing circuitry of a radio transceiver device, causes the radio transceiver device to perform a method according to the first aspect.

According to a sixth aspect there is presented a method for configuring a first radio transceiver device for beam selection. The first radio transceiver device is configured to obtain link quality estimates of a radio signal conveyed to the first radio transceiver device from a second radio transceiver device by means of at least a first beam taken from a first beam set and a second beam. The second beam is wider than the first beam. The method is performed by a network node. The method comprises configuring the first radio transceiver device to select to use for continued communications of radio signals with the second radio transceiver device one of the first beam and the second beam in accordance with a comparison between the link quality estimates of the first beam and compensated link quality estimates of the second beam.

According to a seventh aspect there is presented a network node for configuring a first radio transceiver device for beam selection. The first radio transceiver device is configured to obtain link quality estimates of a radio signal conveyed to the first radio transceiver device from a second rad. The network node comprises processing circuitry. The processing circuitry is configured to cause the network node to configure the first radio transceiver device to select to use for continued communications of radio signals with the second radio transceiver device one of the first beam and the second beam in accordance with a comparison between the link quality estimates of the first beam and compensated link quality estimates of the second beam.

According to an eighth aspect there is presented a network node for configuring a first radio transceiver device for beam selection. The first radio transceiver device is configured to obtain link quality estimates of a radio signal conveyed to the first radio transceiver device from a second rad. The network node comprises processing circuitry and a storage medium. The storage medium stores instructions that, when executed by the processing circuitry, cause the network node to configure the first radio transceiver device to select to use for continued communications of radio signals with the second radio transceiver device one of the first beam and the second beam in accordance with a comparison between the link quality estimates of the first beam and compensated link quality estimates of the second beam.

According to a ninth aspect there is presented a network node for configuring a first radio transceiver device for beam selection. The first radio transceiver device is configured to obtain link quality estimates of a radio signal conveyed to the first radio transceiver device from a second rad. The network node comprises a configure module configured to configure the first radio transceiver device to select to use for continued communications of radio signals with the second radio transceiver device one of the first beam and the second beam in accordance with a comparison between the link quality estimates of the first beam and compensated link quality estimates of the second beam.

According to a tenth aspect there is presented a computer program for configuring a radio transceiver device for beam selection, the computer program comprising computer program code which, when run on processing circuitry of a network node, causes the network node to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these radio transceiver devices, these network nodes, and these computer programs provide efficient beam selection that can be used to streamline, or make more effective, a traditional beam selection procedure.

Advantageously these methods, these radio transceiver devices, these network nodes, and these computer programs results in selection of a beam that could be used to establish a robust communication link, without resulting in any significant drop in received power.

It is to be noted that any feature of the first, second, third, fourth, fifth, sixth, seventh, eighth, ninth, tenth and eleventh aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 2, 3, and 4 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
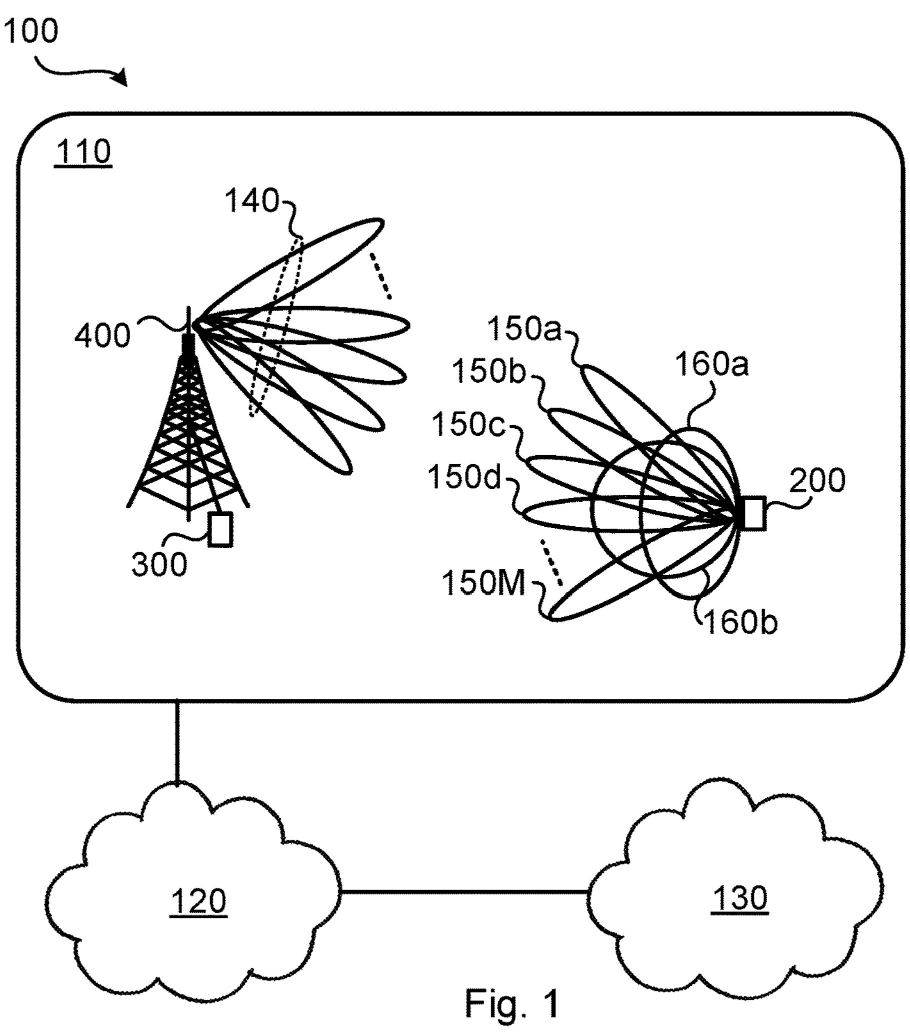
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard.

The communications network 100 comprises at least one network node 300 configured to, via radio transceiver device 400, provide network access to radio transceiver device 200 in a radio access network 110. In some embodiments radio transceiver device 200 is part of, integrated with, or collocated with, a terminal device and radio transceiver device 400 is part of, integrated with, or collocated with, a radio access network node or a TRP. Further, in some embodiments radio transceiver device 400 is part of, integrated with, or collocated with the network node 300.

The radio access network 110 is operatively connected to a core network 120. The core network 120 is in turn operatively connected to a service network 130, such as the Internet. Radio transceiver device 200 is thereby, via the network node 300 and radio transceiver device 400, enabled to access services of, and exchange data with, the service network 130.

Examples of network nodes are radio access network nodes, radio base stations, base transceiver stations, Node Bs, evolved Node Bs, gigabit Node Bs, access points, and access nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

Radio transceiver device 200 and radio transceiver device 400 are assumed to be configured to use beam forming when communicating with each other. In FIG. 1 this is illustrated by beams, collectively identified at reference numeral 140 for beams being used at radio transceiver device 400, and individually identified at reference numerals 150*a*, 150*b*, 150*c*, 150*d*, . . . , 150M, 160*a*, 160*b* for beams being used at radio transceiver device 200. The beams could be used for either transmission only, or reception only, or for both transmission and reception.

Radio transceiver device 200 will below be denoted a first radio transceiver device and radio transceiver device 400 will below denoted a second radio transceiver device. However this is for notational purposes only with the purpose of simplifying the description of the herein disclosed embodiments and does not imply any hierarchical relation between radio transceiver device 200 and radio transceiver device 400.

As disclosed above it could be difficult for radio transceiver devices, such as terminal devices but also radio access network nodes, to select which beam to use. In further detail, selecting the best narrow beam (i.e. "best" according to some quality criterion, such as link quality of the narrow beam) might not be optimal in scenarios where narrow beams suffer from poor robustness characteristics. A wide beam is typically more robust against movement, rotation and blocking, of any of the radio transceiver devices, but may offer a weaker link (i.e. "weak" according to some quality criterion, such as link quality of the link resulting from using the corresponding narrow beam) due to lower beamforming gain.

The embodiments disclosed herein thus relate to mechanisms for beam selection and configuring a first radio transceiver device 200 for such beam selection. In order to obtain such mechanisms there is provided a first radio transceiver device 200, a method performed by the first radio transceiver device 200, a computer program product comprising code, for example in the form of a computer program, that when run on processing circuitry of the first radio transceiver device 200, causes the first radio transceiver device 200 to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method.

FIGS. 2 and 3 are flowcharts illustrating embodiments of methods for beam selection as performed by the first radio transceiver device 200. FIG. 4 is a flowchart illustrating an embodiment of a method for configuring a first radio transceiver device 200 for beam selection as performed by the network node 300. The methods are advantageously provided as computer programs 1020*a*, 1020*b*.

Reference is now made to FIG. 2 illustrating a method for beam selection as performed by the first radio transceiver device 200 according to an embodiment.

When, for example, performing beam training, the first radio transceiver device 200 could include one wide beam in the set of beams to be evaluated. As will be disclosed below, the set of beams to be evaluated could be generated by either the first radio transceiver device 200 or the second radio transceiver device 400 and be used for either reception or transmission. Particularly, the first radio transceiver device 200 is configured to perform step S102:

S102: The first radio transceiver device 200 obtains link quality estimates of a radio signal conveyed to the first radio transceiver device 200 from a second radio transceiver device 400 by means of at least a first beam 150*a*-150M taken from a first beam set and a second beam 160*a*, 160*b*. The second beam 160*a*, 160*b* is wider than the first beam 150*a*-150M.

It is assumed that at least for some scenarios a narrow beam has higher link quality than a wide beam (at least in such scenarios where there is line of sight between transmitter and receiver and the narrow beam is pointing in the line of sight direction) and hence that the link quality estimate of the first beam is higher than the link quality estimate of the second beam. But on the other hand it is assumed that the wide beam is more robust than the narrow beam. Robustness can here be defined in terms of blocking, movement of the first radio transceiver device 200, etc. Robustness will hereinafter be represented by a compensation factor as applied to the link quality estimates of the second beam. Then, instead of selecting the beam strictly based on highest link quality, the first radio transceiver device 200 makes the decision as a trade-off between the narrow beam and the wide beam by jointly considering the link quality and robustness. Particularly, the first radio transceiver device 200 is configured to perform step S104:

S104: The first radio transceiver device 200 selects which one of the first beam 150*a*-150M and the second beam 160*a*, 160*b* to use for continued communications of radio signals with the second radio transceiver device 400. The beam is selected in accordance with a comparison between the link quality estimates of the first beam 150*a*-150M and compensated link quality estimates of the second beam 160*a*, 160*b*.

This allows a wide beam to be selected although it has worse link quality than a narrow beam, thereby balancing link quality and robustness.

Embodiments relating to further details of beam selection as performed by the radio transceiver device 200 will now be disclosed.

There may be different ways to select the first beam from the first beam set. In some aspects link quality estimates of the radio signal are obtained for several beams in the first beam set and the first beam has best link quality estimate of all the beams for which the link quality estimates are obtained. That is, according to an embodiment the first beam 150*a*-150M has best link quality estimates of all beams 150*a*-150M, 160*a*, 160*b* in which the radio signal is received.

There may be different ways to select the beams 150*a*-150M in the first beam set. It could be that there is only one single beam in the first beam set. In other aspects the first beam set comprises narrow pencil beams with different pointing directions. Particularly, according to an embodiment the first beam set comprises at least two beams 150*a*-150M of same width but with mutually different pointing directions. The second beam 160*a*, 160*b* is wider than all beams 150*a*-150M of the first beam set.

There may be different ways to select the second beam. In some aspects there is a single second beam. In other aspects the second beam is taken from a second beam set. That is, according to an embodiment the second beam 160*a*, 160*b* is taken from a second beam set, and all beams 160*a*, 160*b* of the second beam set are wider than the first beam 150*a*-150M.

Further aspects of the first beam, the first beam set, the second beam, and the second beam set will be disclosed below.

The beams could belong to either the first radio transceiver device 200 or the second radio transceiver device 400.

That is, according to a first aspect the beams belong to the first radio transceiver device 200 and are hence used for reception of the radio signal. That is, according to an embodiment the radio signal is conveyed by being received by the first radio transceiver device 200 in at least the first beam 150*a*-150M and the second beam 160*a*, 160*b*.

Further, according to a second aspect the beams belong to the second radio transceiver device 400 and are hence used for transmission of the radio signal. That is, according to an embodiment the radio signal is conveyed by being transmitted by the second radio transceiver device 400 in at least the first beam 150*a*-150M and the second beam 160*a*, 160*b*.

Thus, although the inventive concept as herein disclosed is mainly described as representing a TD RX beam selection in the downlink, the inventive concept is equally applicable for TRP TX beam selection in the downlink, or to TD TX beam selection in the uplink or TRP RX beam selection in the uplink.

There could be different ways to define the compensated link quality estimates. In some aspects the compensated link quality estimates are defined by means of a compensation value. Particularly, according to an embodiment the compensated link quality estimates of the second beam 160*a*, 160*b* are defined as the link quality estimates of the second beam 160*a*, 160*b* increased with a compensation value. A compensation value could thus be used during the beam selection, where the compensation value represents an acceptable drop in link quality between the best narrow beam (as defined by the first beam) and the wide beam (as defined by the second beam).

With intermediate reference again to FIG. 1, assume that the network node 300 has configured the first radio transceiver device 200 with an TD RX beam training procedure where the first radio transceiver device 200 is allowed to evaluate five TD RX beams, and hence the network node 300 transmits, via the second radio transceiver device 400, five reference signals in the same TRP TX beam. The first radio transceiver device 200 determines to evaluate four narrow beams (beams 150*a*, 150*b*, 150*c*, 150*d*, hereinafter denoted B1, B2, B3, B4) and one wide beam (beam 160*a*, hereinafter denoted B5). Assume that the RSRP for the TD RX beams became: B1=−100 dBm, B2=−95 dBm, B3=−110 dBm, B4=−120 dBm, and B5=−97 dBm.

If the acceptable degradation is, say, x dB, where x>0 and x thus defines the compensation value, then if the RSRP of the wide TD RX beam is less than x dB worse than the RSRP best narrow TD RX beam, the first radio transceiver device 200 selects the wide TD RX beam. Assume further that the compensation value for the wide beam is 3 dB, which thus means that if the wide beam has less than 3 dB lower RSRP compared to the best narrow beam, the first radio transceiver device 200 should select the wide beam. In the present illustrative example the best beam, B2, has only 2 dB higher RSRP compared to the wide beam, and hence the first radio transceiver device 200 will select to use the wide beam, B5.

There could be different ways to determine the compensation value.

In some aspects the compensation value takes into account how the first radio transceiver device 200 is moving. According to an embodiment the compensation value depends on at least one of: current speed, current rotation rate, and previous blocking statistics of the first radio transceiver device 200. Typically, the higher speed the first radio transceiver device 200 has, the quicker the first radio transceiver device 200 rotates, and/or the higher the risk of the first radio transceiver device 200 experiencing blocking, the larger the wide beam compensation value could be. The compensation value could thus be adaptively set such that a larger link quality loss is accepted for high expected variation of the selected beam coverage area anticipated cost of losing the beam link.

In some aspects the compensation value takes into account how much worse the link quality of another narrow beam is. Particularly, according to an embodiment the compensation value is dependent on link quality estimates of the radio signal as received in a second first beam 150*a*-150M taken from the first beam set.

In some aspects the so-called another narrow beam is neighbouring the best narrow beam. That is, according to an embodiment the first beam 150*a*-150M and the second first beam 150*a*-150M are neighbouring beams in beam space.

In some aspects the so-called another narrow beam is the second best narrow beam. That is, according to an embodiment the second first beam 150*a*-150M has worse link quality estimates than only the first beam 150*a*-150M.

In case any neighboring narrow beams have almost the same link quality as the best narrow beam, the radio propagation channel will be rather robust with respect to rotation of the first radio transceiver device 200, and hence a low compensation value can be used.

In some aspects each wide beam has its own compensation value. There could thus be more than two different beam widths (e.g. the standard narrow beams plus medium-width plus wide), with different degradation compensation values. That is, according to an embodiment the second beam set comprises beams 160*a*, 160*b* of at least two different widths, each width of which being associated with a respective compensation value for compensating the link quality estimates.

There could be different occasions in which the link quality estimates are obtained, such as during regular data transmission or during dedicated beam training. Thus, according to an embodiment the link quality estimates are obtained during a beam training procedure of the first radio transceiver device 200.

There could be different examples of link quality estimates. For example, the link quality estimates could be obtained in terms of reference signal received power (RSRP), or signal to interference ratio (SIR), or signal to interference plus noise ratio (SINR).

There could be different examples of signals for which the link quality estimates are obtained. In some aspects the estimate are obtained from measurements of reference signals in the radio signal. Particularly, the radio signal could comprise reference signals, such as uplink sounding reference signals (SRS) or downlink channel state information reference signals (CSI-RS), and the link quality estimates could then be obtained for the reference signals.

There could be different ways for the first radio transceiver device 200 to know how to perform the selection in step S104. Either it is hard-coded in the first radio transceiver device 200 how to select the beam to use, or the first radio transceiver device 200 is configured by another device how to select the beam to use. Particularly, according to an embodiment, how to select which one of the first beam 150*a*-150M and the second beam 160*a*, 160*b* to use for continued communications of radio signals with the second radio transceiver device 400 is configured by network information. The network information could be obtained by the first radio transceiver device 200 from the network node 300.

There could be different ways for the beams to be generated. In some aspects the beams are generated using phase shifts only. Particularly, according to an embodiment the at least first beam 150*a*-150M and the second beam 160*a*, 160*b* are created by beamforming of antenna elements of an antenna array where the beamforming consists only of applying phase shifts to the antenna elements. In other aspects the beams are generated using a combination of amplitude tapering and phase shifts. Particularly, according to another embodiment the at least first beam 150*a*-150M and the second beam 160*a*, 160*b* are created by beamforming of antenna elements of an antenna array where the beamforming comprises applying a combination of phase shifts and amplitude tapering to the antenna elements. Wide beams as well as narrow beams could thus be generated by only varying the phase settings of an analog antenna array, or by varying both phase settings and amplitude settings of an analog antenna array. In case the analog array is dual-polarized, so-called dual-polarized beamforming, as further described in WO2011/050866 A1 and WO2016141961 A1, can be used to create the beams. However, the inventive concept could be applied irrespective of the underlying beamforming hardware structure. Thus, while the present embodiment describes the use of analog beamforming, the inventive concept is equally applicable to digital beamforming, in which case the network node 300 would, via the second radio transceiver device 400, transmit a single CSI-RS in the radio signal, and where the different beam options are evaluated by the first radio transceiver device 200 estimating the CSI-RS in the received radio signal.

Reference is now made to FIG. 3 illustrating methods for beam selection as performed by the radio transceiver device 200 according to further embodiments. It is assumed that steps S102, S104 are performed as described above with reference to FIG. 2 and a thus repeated description thereof is therefore omitted.

In view of what has been disclosed above, a wide beam (as defined by the second beam) is selected if its performance is not significantly worse (as defined by the compensation value) than the performance of the narrow beam (as defined by the first beam). Particularly, according to an embodiment the first radio transceiver device 200 is configured to perform step S104*a* as part of the selecting in step S104:

S104*a*: The first radio transceiver device 200 selects to use the second beam 160*a*, 160*b* for continued communications of radio signals with the second radio transceiver device 400 only when the link quality estimates of the second beam 160*a*, 160*b* are within the compensation value of the link quality estimates of the first beam 150*a*-150M.

That is, the second beam 160*a*, 160*b* is selected when the link quality estimates of the second beam 160*a*, 160*b* as compensated by the compensation value are not worse than the link quality estimates of the first beam 150*a*-150M.

Otherwise the narrow beam (as defined by the first beam) is selected. Particularly, according to an embodiment the first radio transceiver device 200 is configured to perform step S104*b* as part of the selecting in step S104:

S104*b*: The first radio transceiver device 200 selects to use the first beam 150*a*-150M for continued communications of radio signals with the second radio transceiver device 400 when the link quality estimates of the second beam 160*a*, 160*b* are not within the compensation value of the link quality estimates of the first beam 150*a*-150M.

That is, the first beam 150$a$-150M is selected when the link quality estimates of the second beam 160$a$, 160$b$ as compensated by the compensation value are still worse than the link quality estimates of the first beam 150$a$-150M.

Once the beam has been selected it can be used during communications between the first radio transceiver device 200 and the second radio transceiver device 400. Particularly, according to an embodiment the first radio transceiver device 200 is configured to perform step S106:

S106: The first radio transceiver device 200 communicates with the second radio transceiver device 400 using the selected beam. In view of what has been disclosed above the selected beam could belong to either the first radio transceiver device 200 or the second radio transceiver device 400.

Reference is now made to FIG. 4 illustrating a method for configuring a radio transceiver device 200 for beam selection as performed by the network node 300 according to an embodiment.

As disclosed above, the first radio transceiver device 200 is configured to obtain link quality estimates of a radio signal conveyed to the first radio transceiver device 200 from a second radio transceiver device 400 by means of at least a first beam 150$a$-150M taken from a first beam set and a second beam 160$a$, 160$b$. The second beam 160$a$, 160$b$ is wider than the first beam 150$a$-150M.

In some aspects it is the network node 300 that configures the first radio transceiver device 200 how to select which beam to use. Thus, the network node 300 is configured to perform step S202:

S202: The network node 300 configures the first radio transceiver device 200 to select to use, for continued communications of radio signals with the second radio transceiver device 400, one of the first beam 150$a$-150M and the second beam 160$a$, 160$b$. The beam is selected in accordance with a comparison between the link quality estimates of the first beam 150$a$-150M and compensated link quality estimates of the second beam 160$a$, 160$b$.

Embodiments relating to further details of configuring a radio transceiver device 200 for beam selection as performed by the network node 300 will now be disclosed.

In general terms, embodiments disclosed above with reference to methods performed by the first radio transceiver device 200 are equally applicable to the network node 300.

Thus, with reference to what has been disclosed above, according to an embodiment the radio signal is conveyed by being received by the first radio transceiver device 200 in at least the first beam 150$a$-150M and the second beam 160$a$, 160$b$.

Thus, with further reference to what has been disclosed above, according to an embodiment the radio signal is conveyed by being transmitted by the second radio transceiver device 400 in at least the first beam 150$a$-150M and the second beam 160$a$, 160$b$.

Thus, with further reference to what has been disclosed above, according to an embodiment the compensated link quality estimates of the second beam 160$a$, 160$b$ are defined as the link quality estimates of the second beam 160$a$, 160$b$ increased with a compensation value.

Thus, with further reference to what has been disclosed above, according to an embodiment the first radio transceiver device 200 is, by the network node 300, configured to select to use the second beam 160$a$, 160$b$ for continued communications of radio signals with the second radio transceiver device 400 only when the link quality estimates of the second beam 160$a$, 160$b$ are within the compensation value worse than the link quality estimates of the first beam 150$a$-150M.

Thus, with further reference to what has been disclosed above, according to an embodiment the first radio transceiver device 200 is, by the network node 300, configured to select to use the first beam 150$a$-150M for continued communications of radio signals with the second radio transceiver device 400 when the link quality estimates of the second beam 160$a$, 160$b$ are not within the compensation value worse than the link quality estimates of the first beam 150$a$-150M.

One particular embodiment for beam selection and for configuring the first radio transceiver device 200 for beam selection based on at least some of the above disclosed embodiments will now be disclosed in detail.

S301: The network node 300 configures a TD RX beam training procedure and signals this to the first radio transceiver device 200. One way to implement step S301 is to perform step S202.

S302: The first radio transceiver device 200 determines which TD RX beams to evaluate. Here, at least one of the TD RX beams has larger beamwidth compared to the remaining TD RX beams.

S303: The second radio transceiver device 400 transmits CSI-RSs according to the TD RX beam training configuration.

S304: The first radio transceiver device 200 sweeps through the determined TD RX beams and performs RSRP measurements on each one of them. One way to implement step S304 is to perform step S102.

S305: The first radio transceiver device 200 determines a compensation value based on different factors (see above for details).

S306: The first radio transceiver device 200 selects the best WD RX beam based on RSRP and the compensation value and uses the selected beam for coming downlink receptions (and optionally also as TD TX beam for uplink transmission). One way to implement step S306 is to perform any of steps S104, S104$a$, S104$b$, and S106.

Figure 6:
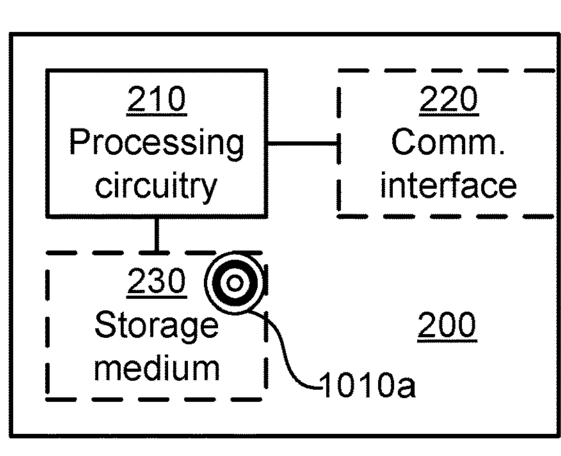
FIG. 6 is a schematic diagram showing functional units of a radio transceiver device according to an embodiment.

FIG. 6 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010$a$ (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, S102-S106, S302, S304, S305, S306, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The radio transceiver device 200 may further comprise a communications interface 220 for communications at least with radio transceiver device 400 and network node 300. As such the communications interface 220 may comprise one or more transmitters and receivers, comprising analogue and digital components.

The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 7:
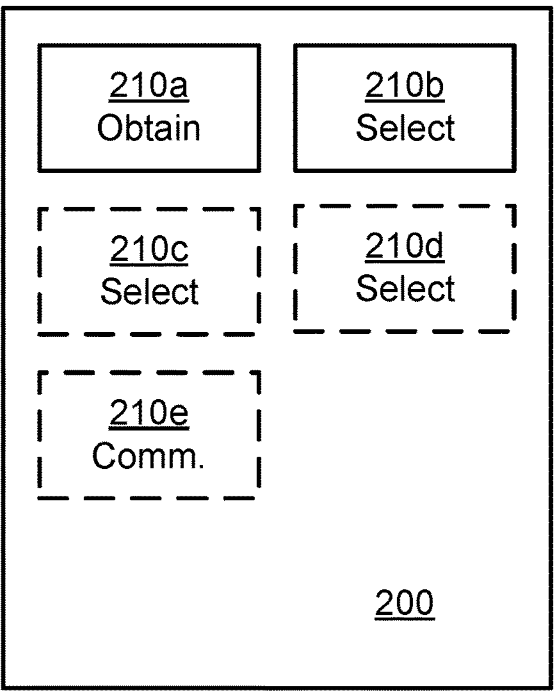
FIG. 7 is a schematic diagram showing functional modules of a radio transceiver device according to an embodiment.

FIG. 7 schematically illustrates, in terms of a number of functional modules, the components of a radio transceiver device 200 according to an embodiment. The radio transceiver device 200 of FIG. 7 comprises a number of functional modules; an obtain module 210*a* configured to perform step S102 and a first select module 210*b* configured to perform step S104. The radio transceiver device 200 of FIG. 7 may further comprise a number of optional functional modules, such as any of a second select module 210*c* configured to perform step S104*a*, a third select module 210*d* configured to perform step S104*b*, and a communicate module 210*e* configured to perform step S106. In general terms, each functional module 210*a*-210*e* may be implemented in hardware or in software. Preferably, one or more or all functional modules 210*a*-210*e* may be implemented by the processing circuitry 210, possibly in cooperation with the communications interface 220 and/or the storage medium 230. The processing circuitry 210 may thus be arranged to form the storage medium 230, fetch instructions as provided by a functional module 210*a*-210*e*, and execute these instructions, thereby performing any steps of the radio transceiver device 200 as disclosed herein.

The radio transceiver device 200 may be provided as a standalone device or as a part of at least one further device. For example, as disclosed above the radio transceiver device 200 could be part of, integrated with, or collocated with, a terminal device.

Figure 8:
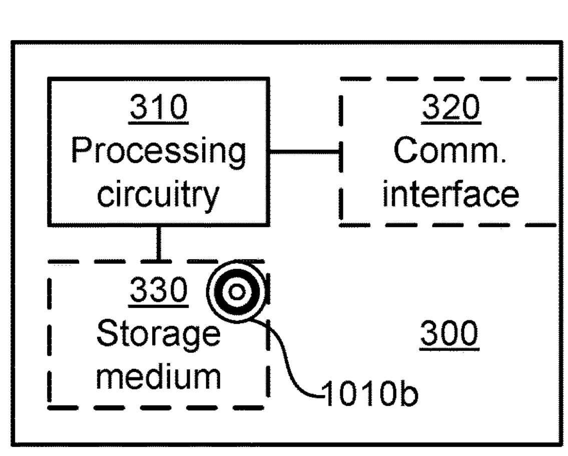
FIG. 8 is a schematic diagram showing functional units of a network node according to an embodiment.

FIG. 8 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010*b* (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, S202, S301, S303, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with radio transceiver device 200 and radio transceiver 300. As such the communications interface 320 may comprise one or more transmitters and receivers, comprising analogue and digital components.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 9:
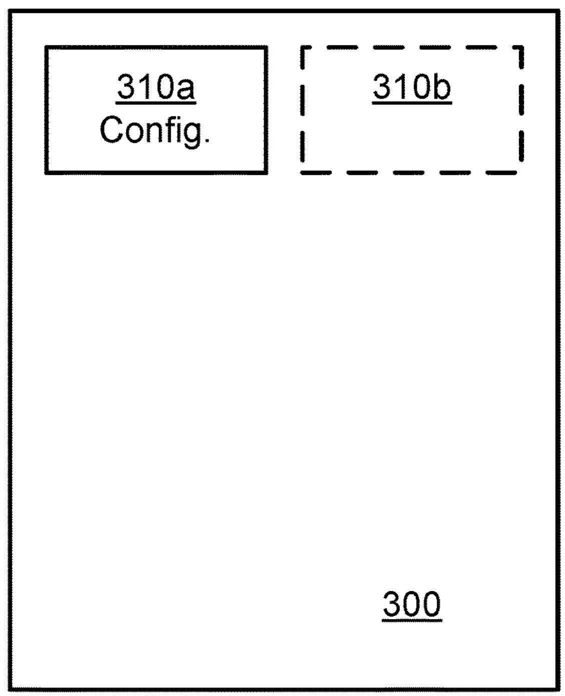
FIG. 9 is a schematic diagram showing functional modules of a network node according to an embodiment.

FIG. 9 schematically illustrates, in terms of a number of functional modules, the components of a network node 300 according to an embodiment. The network node 300 of FIG. 9 comprises a configure module 310*a* configured to perform step S202. The network node 300 of FIG. 9 may further comprise a number of optional functional modules, such as exemplified by module 310*b*. In general terms, each functional module 310*a*-310*b* may be implemented in hardware or in software. Preferably, one or more or all functional modules 310*a*-310*b* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*b* and to execute these instructions, thereby performing any steps of the network node 300 as disclosed herein.

The network node 300 may be provided as a standalone device or as a part of at least one further device. For example, the network node 300 may be provided in a node of the radio access network or in a node of the core network. Alternatively, functionality of the network node 300 may be distributed between at least two devices, or nodes. These at least two nodes, or devices, may either be part of the same network part (such as the radio access network or the core network) or may be spread between at least two such network parts.

Thus, a first portion of the instructions performed by the network node 300 may be executed in a first device, and a second portion of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 8 the processing circuitry 310 may be distributed among a plurality of devices, or nodes. The same applies to the functional modules 310*a*-310*b* of FIG. 9 and the computer program 1020*b* of FIG. 10 (see below).

Figure 10:
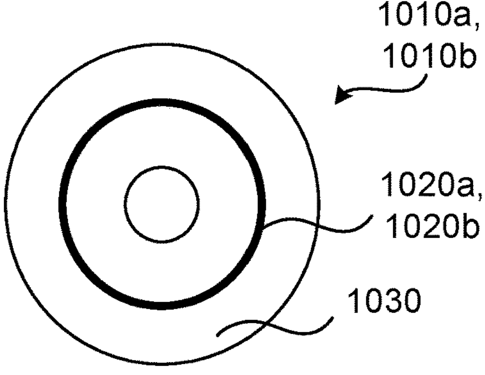
FIG. 10 shows one example of a computer program product comprising computer readable means according to an embodiment.
Figure 5:
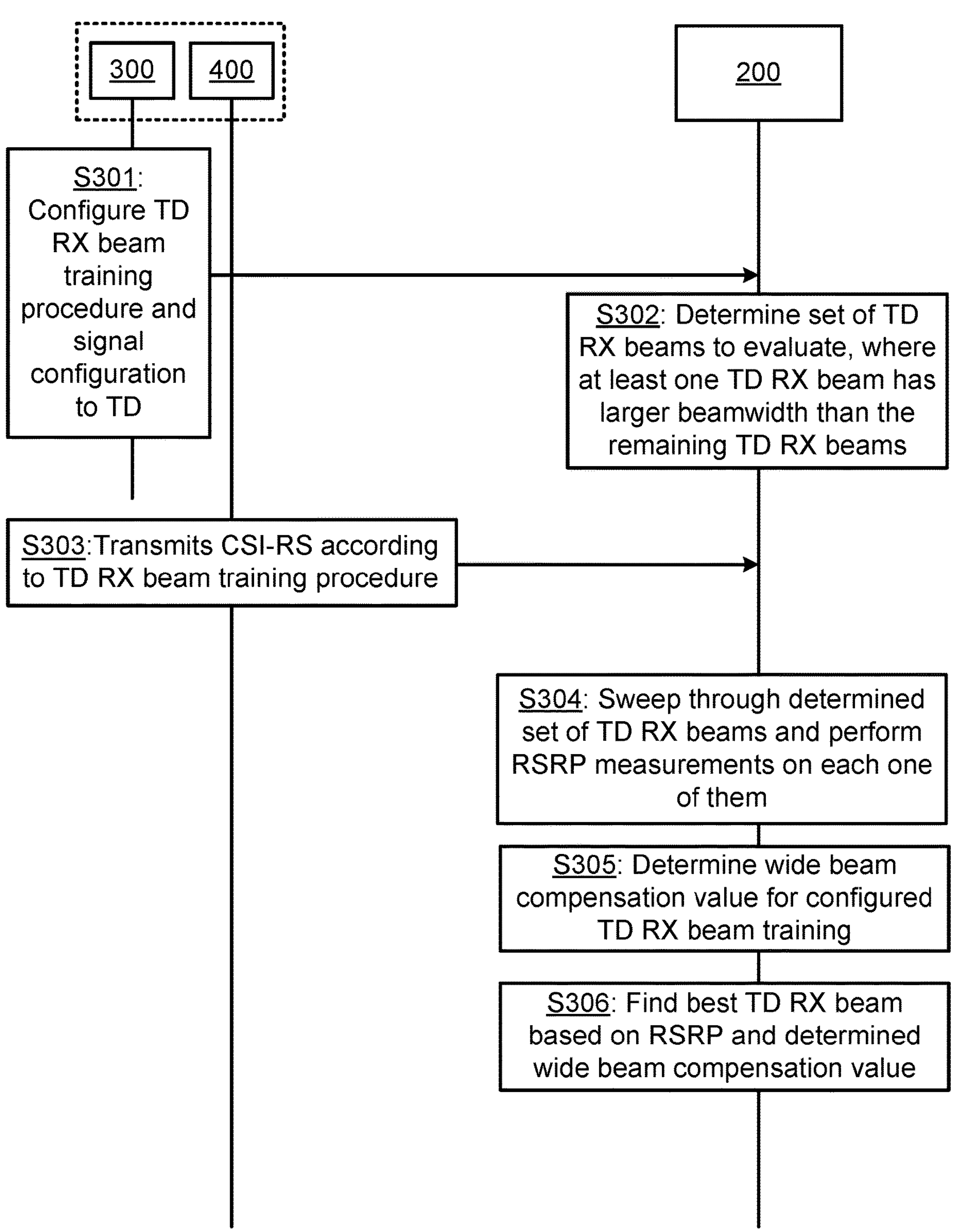
FIG. 5 is a signalling diagram according to an embodiment.

FIG. 10 shows one example of a computer program product 1010*a*, 1010*b* comprising computer readable means 1030. On this computer readable means 1030, a computer program 1020*a* can be stored, which computer program 1020*a* can cause the processing circuitry 210 and thereto operatively coupled entities and devices, such as the communications interface 220 and the storage medium 230, to execute methods according to embodiments described herein. The computer program 1020*a* and/or computer program product 1010*a* may thus provide means for performing any steps of the radio transceiver device 200 as herein disclosed. On this computer readable means 1030, a computer program 1020*b* can be stored, which computer program 1020*b* can cause the processing circuitry 310 and thereto operatively coupled entities and devices, such as the communications interface 320 and the storage medium 330, to execute methods according to embodiments described herein. The computer program 1020*b* and/or computer program product 1010*b* may thus provide means for performing any steps of the network node 300 as herein disclosed.

In the example of FIG. 10, the computer program product 1010*a*, 1010*b* is illustrated as an optical disc, such as a CD (compact disc) or a DVD (digital versatile disc) or a Blu-Ray disc. The computer program product 1010*a*, 1010*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020*a*, 1020*b* is here schematically shown as a track on the depicted optical disk, the computer program 1020*a*, 1020*b* can be stored in any way which is suitable for the computer program product 1010*a*, 1010*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A user equipment (UE) for beam selection, the UE comprising:
- a processing circuitry, wherein the processing circuitry includes one or more processors for controlling operation of the UE;
- one or more transmitters for communication with a radio transceiver device; and
- one or more receivers for communication with the radio transceiver device, wherein
- the UE is configured to:
  - receive, from the radio transceiver device, a first radio signal using a first beam;
  - obtain a first link quality estimate of the first radio signal;
  - receive, from the radio transceiver device, a second radio signal using a second beam, wherein the second beam is wider than the first beam;
  - obtain a second link quality estimate of the second radio signal;
  - obtain a selection of one of the first and second beams to use for communicating with the radio transceiver device; and
  - use the selected beam to communicate with the radio transceiver device,
  - wherein the selection of one of the first and second beams to use for communicating with the radio transceiver device is based on the obtained first link quality estimate and the obtained second link quality estimate.

2. The UE of claim 1, wherein
- the selection of one of the first and second beams to use for communicating with the radio transceiver device is made based on a comparison between the obtained first link quality estimate and the obtained second link quality estimate.

3. The UE of claim 1, wherein obtaining the selection of one of the first and second beams comprises:
- transmitting, to the radio transceiver device, link quality information indicating the first and second link quality estimates; and
- after transmitting the link quality information, receiving, from the radio transceiver device, information indicating the selection of one of the first and second beams to use for communicating with the radio transceiver device.

4. The UE of claim 1, wherein each of the obtained first and second link quality estimates is based on at least one of: reference signal received power (RSRP), signal to interference ratio (SIR), and signal to interference plus noise ratio (SINR).

5. The UE of claim 1, wherein
- each of the first and second link quality estimates is obtained from measurement of reference signals, and
- the reference signals include uplink sounding reference signals (SRS) or downlink channel state information reference signals (CSI-RS).

6. The UE of claim 1, wherein the selection of one of the first and second beams to use for communicating with the radio transceiver device is made based on compensating the obtained second link quality estimate by increasing the obtained second link quality estimate by the compensation value.

7. The UE of claim 1, wherein the compensation value represents an acceptable drop in link quality between the first and second beams.

8. The UE of claim 1, wherein the compensation value varies based on one or more of:
- a current speed of the UE;
- a current rotation rate of the UE; and/or
- previous blocking statistics of the UE.

9. The UE of claim 1, wherein
- the second beam is selected to be used by the UE to communicate with the radio transceiver device when a difference between the obtained first and second link quality estimates is less than the compensation value, and
- the first beam is selected to be used by the UE to communicate with the radio transceiver device when the difference between the obtained first and second link quality estimates is greater than the compensation value.

10. The UE of claim 1, wherein the radio transceiver device is one of a radio access network node, a radio base station, a base transceiver station, a Node B, an evolved Node B, a gigabit Node B, an access point, and an access node.

11. A network node for configuring a user equipment (UE) for beam selection, the network node comprising:
- a processing circuitry, wherein the processing circuitry includes one or more processors for controlling operation of the network node;
- one or more transmitters for communication with the UE; and
- one or more receivers for communication with the UE, wherein
- the network node is configured to:
  - configure the UE to obtain a selection of one of first and second beams to use for communicating with a radio transceiver device, wherein the selection of one of the first and second beams is based on a first link quality estimate of a first radio signal received from the radio transceiver device using the first beam and a second link quality estimate of a second radio signal received from the radio transceiver device using the second beam; and configure the UE to communicate with the radio transceiver device using the selected beam, and the second beam is wider than the first beam.

12. The network node of claim 11, wherein the selection of one of the first and second beams to use for communicating with the radio transceiver device is made based on a comparison between the obtained first link quality estimate and the obtained second link quality estimate.

13. The network node of claim 12, wherein the selection of one of the first and second beams to use for communicating with the radio transceiver device is made further based on a compensation value.

14. The network node of claim 13, wherein the selection of one of the first and second beams to use for communicating with the radio transceiver device is made based on compensating the obtained second link quality estimate by increasing the obtained second link quality estimate by the compensation value.

15. The network node of claim 13, wherein the compensation value represents an acceptable drop in link quality between the first and second beams.

16. The network node of claim 13, wherein the compensation value varies based on one or more of:

a current speed of the UE;

a current rotation rate of the UE; and/or previous blocking statistics of the UE.

17. The network node of claim 13, wherein the second beam is selected to be used by the UE to communicate with the radio transceiver device when a difference between the obtained first and second link quality estimates is less than the compensation value, and the first beam is selected to be used by the UE to communicate with the radio transceiver device when the difference between the obtained first and second link quality estimates is greater than the compensation value.

18. A method performed by a user equipment (UE) for beam selection, the method comprising:

receiving, from a radio transceiver device, a first radio signal using a first beam;

obtaining a first link quality estimate of the first radio signal;

receiving, from the radio transceiver device, a second radio signal using a second beam, wherein the second beam is wider than the first beam;

obtaining a second link quality estimate of the second radio signal;

obtaining a selection of one of the first and second beams to use for communicating with the radio transceiver device; and using the selected beam to communicate with the radio transceiver device, wherein the selection of one of the first and second beams to use for communicating with the radio transceiver device is based on the obtained first link quality estimate and the obtained second link quality estimate.

* * * * *